United States Patent [19]

Najmr et al.

[11] Patent Number: 4,685,935
[45] Date of Patent: Aug. 11, 1987

[54] PROCESS FOR PRODUCING PURE MAGNESIUM SULPHITE

[75] Inventors: Stanislav Najmr, Prague; Zdenek Jerman, Usti n/L; Jaroslav Kralicek, Prague, all of Czechoslovakia

[73] Assignee: Vysoka Skola chemicko-technologicka, Prague, Czechoslovakia

[21] Appl. No.: 879,343

[22] Filed: Jun. 26, 1986

Related U.S. Application Data

[63] Continuation-in-part of Ser. No. 744,779, Jun. 14, 1986, abandoned, which is a continuation-in-part of Ser. No. 451,866, Dec. 12, 1982, abandoned.

[30] Foreign Application Priority Data

Dec. 21, 1981 [CS] Czechoslovakia ............... 9633-81

[51] Int. Cl.$^4$ ........................ C01F 5/42; C01D 5/16
[52] U.S. Cl. .................................... 23/304; 23/307; 23/296; 423/159; 423/512 A; 423/158
[58] Field of Search ............ 423/158, 159, 512 A, 423/519; 23/307, 304, 296, 301 R

[56] References Cited

U.S. PATENT DOCUMENTS

| 3,630,692 | 12/1971 | Green et al. | 23/301 R |
| 3,812,235 | 5/1974 | Robinson | 423/158 |
| 4,431,615 | 2/1984 | Gabra | 423/519 |
| 4,474,737 | 10/1984 | Najmr et al. | 23/304 |

FOREIGN PATENT DOCUMENTS 209952 8/1982 Czechoslovakia .

OTHER PUBLICATIONS

Mullin, J. W., "Crystallisation"; CRC Press; pp. 233–234; (1975).

Primary Examiner—Benoit Castel

[57] ABSTRACT

A process for producing a pure magnesium sulphite from crude crystalline magnesium sulphite. Into a full suspension or flow containing magnesium sulphite crystals at least one further water-containing and heat-supplying flow is led. The heat-supplying flow rapidly increases the temperature of the suspension to above 80° C. in less than 10 seconds, preferably in less than 2 seconds. The solid water-insoluble fraction is then separated from the resulting flow, and the pure product is recrystallized from the solution. The solution may be recycled into the process either for further purification or for use as at least one heat-supplying flow.

10 Claims, 1 Drawing Figure

PROCESS FOR PRODUCING PURE MAGNESIUM SULPHITE

This application is a continuation-in-part of application Ser. No. 744,779 filed on June 14, 1986, which in turn is a continuation-in-part of application Ser. No. 451,866 filed on on Dec. 12, 1982, both now abandoned.

The invention relates to a process for producing pure magnesium sulphite from a crude flow of raw magnesium sulphite hexahydrate by maintaining a supersaturated metastable solution through rapid heating by a second flow, so that solid impurities are separated and a pure product is obtained by crystallization, without recrystallization of undesirable byproducts. The process may also be used to purify hexahydrate having admixtures of magnesium sulphate trihydrate.

BACKGROUND OF THE INVENTION

Magnesium sulphite is an important intermediate in many large-scale chemical processes, such as the desulphurization of gases and air pollutants by the magnesite process. However, magnesium sulphite is in many cases considerably contaminated by solid impurities from the starting magnesite and other impurities from flue gases. Industrial applications require pure magnesium sulphite, and purification methods have been developed to meet this need.

The removal of impurities from easily soluble crystalline substances on the basis of solubility differences occurring at different temperatures is known. J. W. Mullin, Crystallization, CRC Press. These processes relate to the separation and subsequent crystallization of dissolved substances in solutions having concentrations that are as close as possible to the equilibrium determined by the temperature and pressure to which the solution is exposed. A disadvantage of this method is that it requires a considerable amount of time for the dissolving and crystallization steps, in order to obtain a sufficient yield.

Magnesium sulphite is highly insoluble; only 0.7% by weight readily dissolves. The magnesite impurities contained in raw magnesium sulphite are also highly insoluble. The equilibrium concentrations of these materials in solution is thus very low. As a result, traditional separation methods based on differential solubility in water (as taught by Mullin) have not been successful, and are not used in the industry.

It is also known that the solubility of some substances (such as $MgSO_3$) is anomalous under certain temperature-dependent conditions, and that transient supersaturated metastable solutions can arise when these conditions are met. See Czechoslovak Author's Certificate No. 209,952. However, such metastable solutions have been unpredictable, very short lived, difficult to control, and they rapidly revert to equilibrium solutions by crystallization of the excess. This phenomenon has not been efficient when used in a commercial process because of the serious recrystallization problem. The known process requires the rapid dissolution of magnesium sulphite crystals in water, and the rapid separation of impurities from the resulting warm solution. The preparation of this solution on an industrial scale has met with many difficulties. The required supersaturated solution could not be induced at all upon dissolution in a stirred heated charging reactor. Instead, $MgSO_3.6H_2O$ was immediately recrystallized into $MgSO_3.3H_2O$.

Dissolution in a through-flow tubular reactor produced a supersaturated solution, but only for a very short time after start-up. The concentration of the solution then decreased, and the device had to be taken out of operation after several hours because the piping became encrusted with $MgSO_3.3H_2O$ crystals. A major disadvantage of the known method resides in the undesirable conversion of hexahydrate into trihydrate, with the resulting accumulation of trihydrate in the pipes during heating. This causes interruption of the process for periodic and laborious cleaning of the pipes.

The known process is successful only if the extraction and separation of impurities can be achieved rapidly, within the short life of the metastable solution. In addition, the known process is disadvantageous because it requires that the raw hexahydrate be free of magnesium sulphite trihydrate, since the presence of trihydrate produces a seeding effect which prohibits the extraction of hexahydrate and produces a poorly soluble trihydrate in industrial plants at temperatures of from 60° to 120° C.

Other apparently promising methods of obtaining a useful metastable solution have not been successful. Indirect heating in a continuous heat exchanger results in rapid fouling and clogging of the exchanger with incrustations of trihydrate. Precipitate also accumulates in a batch reactor, or in a batch reactor used in combination with a heat exchanger. In order to obtain the most efficient use of the metastable solution, it is necessary to minimize (and if possible completely avoid) the gratuitous conversion of hexahydrate into trihydrate. This objective is particularly difficult in the known processes, because the temperatures they disclose encourage the formation of an undesired stable trihydrate solid in equilibrium with the desired liquid solution. Trihydrate precipitation and its later removal have therefore become recognized as necessary though undesirable features of the art processes.

SUMMARY OF THE INVENTION

According to the invention, pure magnesium sulphite can be obtained from raw magnesium sulphite hexahydrate, based on the recrystallization of magnesium sulphite from a metastable solution of magnesium sulphite hexahydrate, by a process wherein a suspension of raw hexahydrate in water or a magnesium sulphate solution is heated above 80° C. within a period of less than 10 seconds, preferably 2 seconds. Solid impurities are then separated from the resulting metastable solution, and the isolated product is processed into pure magnesium (II) salt. The rapid heating is achieved by abruptly mixing a heat supplying flow or flows with a primary flow of the raw hexahydrate in suspension. The heat supplying flow can preferably be water vapor and/or a recycled solution remaining after the recrystallization of pure magnesium sulphite from the metastable solution. The metastable magnesium sulphite solution is cooled before recrystallizing the hexahydrate or the hexahydrate with trihydrate, but the magnesium sulphite trihydrate is allowed to crystallize from the hot metastable solution without intentional cooling. Another metastable solution producing additional pure product can be prepared by reheating to above 80° C., as described above.

According to the professional literature, cf., D. Trendafeloff et al., Chim. Ind. Vol. 46 No. 10, page 438 (Sofia: 1974), magnesium sulphite dihydrate is stable at temperatures above 80° C. According to the invention, magnesium sulphite trihydrate is stable below 80° C., but if this temperature is rapidly exceeded, the trihydrate cannot act as an undesirable seeding agent. Thus, the present invention permits the purification of raw hexahydrate with an admixture of trihydrate —which cannot be achieved according to the method provided in Czechoslovak Inventor's Certificate No. 209,952. This improvement broadens the substrates available for use in the process, and provides for advantageous and efficient recirculation of the solution remaining after isolation of the product.

For example, it is possible to purify (a) raw hexahydrate containing up to 40 mol. % of trihydrate from the overall magnesium sulphite content, or (b) trihydrate after recrystallization to hexahydrate. Since magnesium sulphite trihydrate becomes thermodynamically stable at about 40° C. and above, its formation is frequent in industrial processes, such as the magnesite process of desulphurization of flue gases, and the process of the invention is therefore quite important when industrially applied.

The present process is also important for purifying hexahydrate without any trihydrate admixture. The invention provides for a rapid mixing of the hexahydrate suspension with a second heat supplying flow or flows, and the very rapid temperature increase to above 80° C. prolongs the life of the metastable solution in a manner not heretofore known in the art. Once the prolonged metastable solution is produced, the separation of solid impurities is a relatively simple matter. The process is also advantageous because it decreases the rate of failure of the industrial purification apparatus, by preventing sedimentation of trihydrate in the pipes.

According to the present invention, trihydrate deposits are prevented by homogeneous heating of the entire volume of the flow, so that subsequent precipitate removal is not necessary. Instead of conventional contact heating, a second watercontaining flow, such as steam or heated water is used. The second flow is introduced to the first flow, or liquid phase, of aqueous $MgSO_3.6H_2O$ in an amount and temperature chosen to produce, upon intermixing of the two phases, a flow with a temperature in excess of 80° C. (preferably 90°–120° C.). The magnesium sulphite hexahydrate concentration in the initial suspension is selected so that the $MgSO_3$ content is in excess of 2% (preferably 7%) by weight after addition of the second phase (water vapor) and its condensation and intermixing with the first phase. Water vapor is a preferred heat-supplying flow because of its high enthalpy. In a cyclical process, according to the invention, the heat-supplying flow can be obtained from the warm solution remaining after the crystallization of pure product, thereby minimizing the amount of energy needed to produce the desired heated flow.

A particular advantage of the process in accordance with the invention is the fact that heating does not take place through the mediation of a heat exchanging surface whereupon $MgSO_3.3H_2O$ and further salts would crystallize out as a result of overheating. The whole volume of the suspension is homogeneously heated. The heating of the suspension to the required temperature is also practically immediate, so that the life of the metastable solution of magnesium sulphite is prolonged for efficient separation of solid impurities. Another advantage of the invention is that the necessary apparatus is relatively small and simple.

Steam can be used for heating the suspension of magnesium sulphite crystals because the consumption of steam is low due to its high thermal content; and the solution is only negligibly diluted. To prevent undue thickening, it is advantageous to dilute the flow to a content of from 2 to 15% by weight of $MgSO_3$ in the final outlet flow. It is then advantageous to lead overheated hot water or waste warm water into the flow of suspension containing magnesium sulphite crystals. The introduction of steam can be completely abolished, or if it is used, it may be used only for equalizing thermal balance. Besides water and steam, aqueous solutions can also be used, preferably solutions of $MgSO_3$ or $Mg(HSO_3)_2$ or $MgSO_4$ or a combination of these salts. This enables waste diluted solutions to be employed, which originate with magnesium sulphite processing. In this manner, the excess components are reintroduced and recirculated into the process.

A liquid phase cleared entirely or to a substantial extent of solid water insoluble impurities is considered a pure magnesium sulphite solution. Dissolved salts such as $Mg(HSO_3)_2$ are not prejudicial to further treatment or industrial use, and are not considered impurities.

The obtained pure supersaturated magnesium sulphite solution can change spontaneously and relatively quickly into a stable state accompanied by the formation of magnesium sulphite crystals. Either $MgSO_3.6H_2O$ or $MgSO_3.3H_2O$ or a mixture of both, if need be, will result, depending upon the protocol. The crystals are extremely pure and contain up to 99.8% by weight of $MgSO_3$ (calculated in the anhydrous state). Other salts, such as $MgSO_4$ and $Mg(HSO_3)_2$ remain in the solution.

The metastable solution of hexahydrate can be processed to pure magnesium (II) salt in various ways. The most simple method involves the processing of pure magnesium sulphite. If the metastable solution is quickly cooled, a hexahydrate is obtained at a temperature below 40° C. If the metastable solution is slowly cooled, a hexahydrate/trihydrate mixture is obtained at a temperature below 40° C. If the temperature is maintained continuously at above 40° C., pure trihydrate is obtained, while at temperatures above 80° C., magnesium sulphite hydrate is obtained.

When purifying raw hexahydrate with a trihydrate admixture, the yield of the process is less than for a single extraction of trihydrate-free hexahydrate. When the initial content of the raw material is from 5 to 40 mol. % trihydrate, about 10 to 50 mol. % of magnesium sulphite is lost as sludge. In the absence of a trihydrate admixture, the losses to sludge are only 2 to 5%. When the magnesium sulphite trihydrate content of the sludge is high, the trihydrate may be subjected to hydration in suspension in an aqueous or magnesium sulphate solution. This results in crystallization of contaminated hexahydrate, which may be separated from the sludge by sedimentation, or by other known means, and which may be repeatedly extracted according to the invention. In this way, the final yield of magnesium sulphite may reach 95 to 98%.

The process according to the invention may be employed in the production of cellulose and pure magnesium oxide, since the recrystallized magnesium sulphite produced by the process is very pure. The maximum weight percentages of the main contaminents are: 0.1% Ca; 0.05% Fe; and 0.50% Mn. The invention can also be used in connection with waste gas desulphurization. The invention is suitable for the magnesium bisulphite process, which uses ferrous types of magnesite having an iron content above 5% by weight of magnesium raw material. In prior methods the iron content limit was 1.5% by weight. The process according to the invention also permits the purification of magnesium sulphite produced in the magnesia scrubbing process used for the removal of sulphur dioxide from the products of coal combustion in power stations; the process results in the production of magnesium oxide having a purity over 98.5% by weight. Such magnesium oxide can be used for producing clinker MgO, as well as for other chemical purposes.

BRIEF DESCRIPTION OF THE DRAWING

The solubility characteristics of magnesium sulphite are illustrated by FIG. 1.

DETAILED DESCRIPTION

Figure 1:
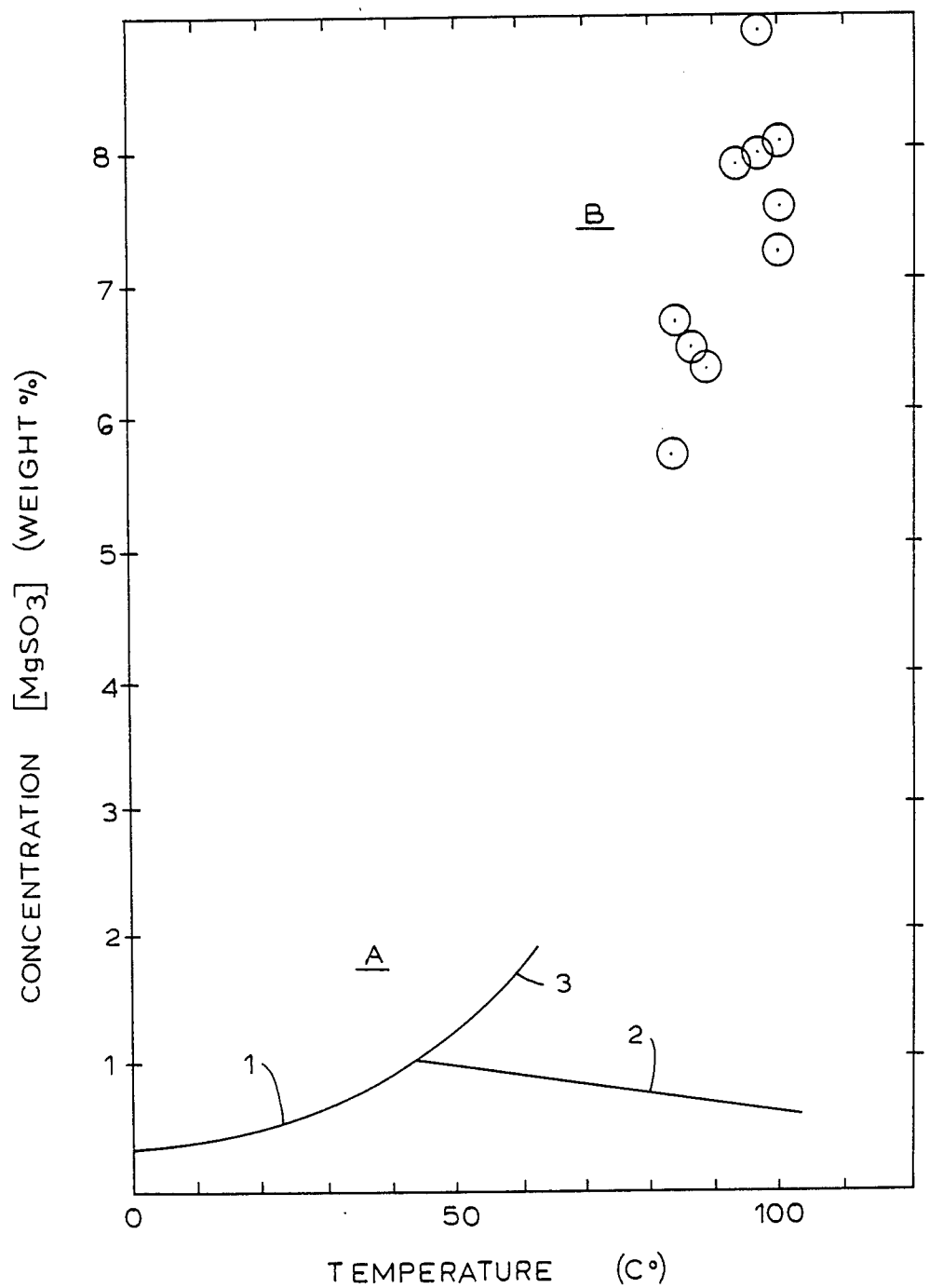

FIG. 1 shows the behavior of the $H_2O$ —$MgSO_3$ system relative to temperature. Part A represents the known solubility curve of magnesium sulphite in water. See, e.g., *Gmelin Handbuch der anorganischen Chemie*, 8th Ed., p. 208. Part B illustrates the solubility characteristics of metastable magnesium sulphite according to the present invention.

Curve 1 represents the maximum concentration of an aqueous $MgSO_3$ solution in equilibrium with solid $MgSO_3.6H_2O$. Curve 2 represents the equilibrium of aqueous $MgSO_3$ at higher temperatures, in excess of 42° C. The maximum equilibrium concentration is about one percent by weight of $MgSO_3$ at about 42° C. The concentration decreases at both higher and lower temperatures.

Curve 3 represents an ephemeral metastable and supersaturated solution of $MgSO_3$, which may be induced at temperatures above 42° C. The supersaturated solution rapidly reverts to the saturated equilibrium given by curve 2 with precipitation of $MgSO_3.3H_2O$. Curve 3 reaches a maximum heretofore reliable concentration of 2 percent at temperatures above 65° C.

Section B of FIG. 1 shows experimental points corresponding to the concentration of $MgSO_3$ in solutions prepared according to the invention. It is possible, as dislosed herein, to achieve a repeatable metastable solution with an $MgSO_3$ concentration of about 8 percent by weight.

The invention is further described according to a number of examples. It will be understood by those in the art that these examples are illustrative, and do not serve to limit the scope of the invention or the appended claims.

EXAMPLE 1

A suspension of crude magnesium sulphite having a temperature of 35° C. was led into piping having a length of 4 m at a rate of 1420 kg/hr by using a pump.
Composition of suspension:
  20% by weight of solid phase
  80% by weight of liquid phase
Composition of solid phase:
  70% by weight of $MgSO_3.6H_2O$
  30% by weight of solid impurities
Composition of liquid phase:
  0.5% by weight of $MgSO_3$
  0.1% by weight of $Mg(HSO_3)_2$
  4.4% by weight of $MgSO_4$ Steam having a pressure of 0.6 MPa was lead into the piping immediately after the pump. The steam supply was controlled by a valve according to the temperature indicated by a thermometer which was disposed in the piping at the exit end, the temperature of the liquid being controlled so that the temperature of the outflowing suspension was 100+/−4° C. Steam consumption was approximately 100 kg/hr. The delivery end of the piping was connected to a continuous sedimentation centrifuge which yielded 200 kg/hr of thickened brown suspension and 1300 kg/hr of nearly clear suspension. The composition of the thickened suspension was as follows:
  41% by weight of solid phase
  59% by weight of liquid phase
Composition of the pure supersaturated solution was as follows:
  9.0% by weight of $MgSO_3$
  0.1% by weight of $Mg(HSO_3)_2$
  4.2% by weight of $MgSO_4$
  0.5% by weight of solid impurities.

EXAMPLE 2

A raw hexahydrate suspension obtained by 4 hours of recrystallization of raw trihydrate at 30° C. contained 26.8% by weight of solid phases suspended in a solution containing 11% by weight of $MgSO_4$ and 1% by weight of $MgSO_3$. Solid phases contained in a metastable magnesium sulphite solution are, by weight, 71.9% $MgSO_3.6H_2O$; 17.4% $MgSO_3.3H_2O$; and 10% insoluble compounds of Ca, Fe, Mg, Si, and other elements found in natural magnesite. The trihydrate portion of the overall magnesium sulphite content was 24.5 mol. %. The suspension was then mixed in a continuous mixer with solution containing 9% by weight of $MgSO_4$ and 1% be weight of $MgSO_3$ as well as with water vapor, the suspension flow speed having been 15 liters/min. and the solution flow speed having been 10 liters/min. The water vapor through-flow was automatically controlled so as to maintain a temperature of from 89° to 91° C. in the mixer. A suspension of solid impurities in a metastable solution of magnesium sulphite hexahydrate in the mixer was conveyed from the mixer to a centrifuge, for separation of the sludge. The metastable solution contained 5.5% by weight of $MgSO_3$. From the total amount of magnesium sulphite in the initial suspension, 68% was converted into metastable solution, while the residue remained together with the insoluble substances as trihydrate.

EXAMPLE 3

A raw hexahydrate suspension obtained by 4 hours of recrystallization of raw trihydrate at 30° C. contained 29.2% by weight of solid phases suspended in a solution containing 11% by weight of $MgSO_4$ and 1% by weight of $MgSO_3$. Solid phases contained in a metastable magnesium sulphite solution are, by weight, 70% $MgSO_3.6H_2O$; 18.7% $MgSO_3.3H_2O$; and 11.3% insoluble compounds. The trihydrate portion of the overall magnesium sulphite content was 26.4 mol. %. The suspension was then mixed in a mixer with a solution containing 9% by weight of $MgSO_4$ and 1% by weight of $MgSO_3$ as well as with water vapor, the suspension flow speed having been 15 liters/min. and the $MgSO_4$ solution flow speed having been 12 liters/min. The water vapor through-flow was automatically controlled so as to maintain a temperature of from 89° to 91° C. in the mixer. A suspension of solid impurities in a metastable solution of magnesium sulphite hexahydrate in the mixer was conveyed from the mixer to a centrifuge, for separation of the sludge. The metastable solution contained 5.6% by weight of $MgSO_3$. From the total amount of magnesium sulphite in the initial suspension, 67% was converted into metastable solution, while the residue remained together with the insoluble substances as trihydrate.

We claim:

1. A process for producing pure magnesium sulphite from crude crystalline magnesium sulphite, comprising the steps of preparing a suspension containing raw magnesium sulphite hexahydrate in a fluid selected from the group consisting of water and a magnesium sulphate solution, to form a first flow;

rapidly heating the first flow to above 80° C. in less than 10 seconds by rapidly introducing at least one water-containing phase to the first flow as a second heat-supplying flow, to form a resulting flow comprising a metastable supersaturated solution of from 2 to 25 percent by weight of magnesium sulphite said second heat-supplying flow being at least one water-containing phase selected from the group consisting of water, water vapor, a solution remaining after crystallization of pure magnesium (II) sulphite from the metastable solution, aqueous magnesium sulphite, aqueous magnesium hydrogen sulphite, aqueous magnesium sulphate, and a combination thereof;

separating a resulting solid water-insoluble fraction from the resulting flow; and recrystallizing pure magnesium (II) salt from the resulting flow.

2. A process according to claim 1, wherein the first flow is rapidly heated to above 80° C. in less than 2 seconds.

3. A process according to claim 1, wherein said second heat-supplying flow comprises a fluid selected from the group consisting of water, water vapor, and a solution remaining after the recrystallization of pure magnesium sulphite from the metastable solution.

4. A process according to claim 1, wherein the metastable magnesium sulphite solution is cooled before recrystallizing hexahydrate with a solution selected from the group consisting of trihydrate and hexahydrate.

5. A process according to claim 1, wherein magnesium sulphite trihydrate is allowed to crystallize from the hot metastable solution without intentional cooling.

6. A process according to claim 1, wherein another metastable solution producing additional pure magnesium (II) salt is prepared by rapidly reheating said solution to above 80° C.

7. A process according to claim 1, wherein the second heat-supplying flow is a solution selected from the group consisting of aqueous magnesium sulphite, aqueous magnesium hydrogen sulphite, aqueous magnesium sulphate, and a combination of these magnesium salts.

8. A process according to claim 1, wherein the resulting solid water-insoluble fraction is separated by a technique selected from the group consisting of filtration, sedimentation, cycle thickening, passage through a magnetic field, and centrifugation.

9. A process for producing pure magnesium sulphite from crude crystalline magnesium sulphite, comprising the steps of preparing a suspension containing raw magnesium sulphite hexahydrate in a fluid selected from the group consisting of water and a magnesium sulphate solution, to form a first flow;

rapidly heating the first flow to above 80° C. in a time interval of less than 10 seconds by abruptly introducing to the first flow as a second heat-supplying flow, to form a resulting flow comprising a metastable supersaturated solution of from 2 to 25 percent by weight of magnesium sulphite, said second heat-supplying flow being at least one water-containing phase selected from the group consisting of water, water vapor, a solution remaining after recrystallization of pure magnesium (II) sulphite from the metastable solution, aqueous magnesium sulphite, aqueous magnesium hydrogen sulphite, aqueous magnesium sulphate and a combination thereof;

separating a resulting solid water-insoluble fraction from the resulting flow by a technique selected from the group consisting of filtration, sedimentation, cycle thickening, passage through a magnetic field, and centrifugation;

recrystallizing pure magnesium (II) salt from the resulting flow thereby leaving behind a remaining solution;

allowing magnesium sulphite trihydrate to crystallize from the metastable solution without intentional cooling;

cooling the metastable magnesium solution prior to recrystallizing hexahydrate with a solution selected from the group consisting of trihydrate and hexahydrate; and repeating the process by preparing a new suspension and a new metastable solution by recirculating and reheating the solution remaining after recrystallization of pure magnesium (II) salt.

10. A process according to claim 9, wherein the suspension is rapidly heated to above 80° C. in less than 2 seconds.

* * * * *